United States Patent Office 2,856,407
Patented Oct. 14, 1958

2,856,407

AMINOACID ESTERS OF N-SUBSTITUTED 3 AND 4-PIPERIDINOLS

John H. Biel, Milwaukee, Wis., assignor to Lakeside Laboratories, Inc., a corporation of Wisconsin No Drawing. Application August 8, 1956
Serial No. 602,918

12 Claims. (Cl. 260—247.2)

This invention relates to hydroxypiperidines. More particularly, this invention is concerned with novel aminoacid esters of hydroxypiperidines and methods of producing such compounds.

I have discovered and provide by this invention novel N,N-disubstituted amino monocarboxylic acid esters of N-substituted 3-hydroxypiperidine and N-substituted 4-hydroxypiperidine of the formulae:

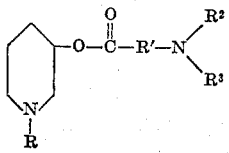

and

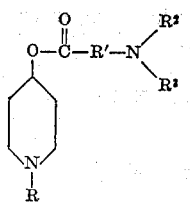

and acid addition and quaternary ammonium salts thereof, wherein R is an alkyl group, preferably a lower alkylene group, or an aralkyl group, preferably of the lower alkyl-monocyclic aryl type, R' is a lower alkyl group, and $R^2$ and $R^3$ are the same or different lower alkyl groups, aralkyl groups, preferably monocyclic aryl-lower alkyl groups such as benzyl and phenethyl, aryl groups, preferably monocyclic aryl groups such as the phenyl group, lower alkene groups such as the allyl group, and groups in which $R^2$ and $R^3$ are joined to form a heterocyclic structure, preferably of 5 or 6 atoms in the ring, such as in pyrrolidino, piperidino and morpholino.

Compounds of the above formulae may be conveniently prepared as the free base by reacting an ester of the aminoacid with the N-substituted 3 or 4-hydroxypiperidines. This reaction employing 3-hydroxypiperidines may be represented as follows:

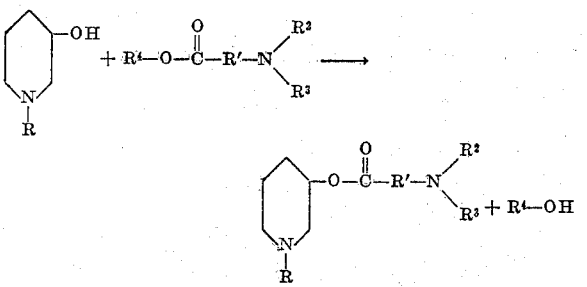

wherein R, R', $R^2$ and $R^3$ have the significance previously assigned and $R^4$ is a hydrocarbon group, preferably a lower alkyl group. The reaction is, of course, equally applicable when 4-hydroxypiperidines are used.

Some N-substituted 3 or 4-piperidinols which may be employed as starting materials are N-methyl-3-piperidinol, N-ethyl-4-piperidinol, N-propyl-4-piperidinol, N-benzyl-3-piperidinol, N-phenethyl-3-piperidinol and N-phenylpropyl-4-piperidinol.

Typical aminoacids which may be used, as esters, in the reaction are 3-morpholinopropionic acid, 3-pyrrolidinopropionic acid, 3-piperidinopropionic acid, 2-dimethyl-aminoacetic acid, 3-dimethylaminopropionic acid, 4-dipropylaminobutyric acid, diphenylaminoacetic acid, 5-dibenzylaminovaleric acid and the like. Lower alkyl esters of these compounds may be used in the reaction, and preferably the methyl and ethyl esters.

The reaction is conveniently carried out by contacting an ester of the aminoacid with the N-substituted 3 or 4-piperidinol in the presence of an inert solvent such as n-heptane, methylcyclohexane or xylene. A small amount of an alkali metal alkoxide, such as sodium methoxide, is generally added to catalyze the reaction. About equimolar quantities of the reactants are preferably used. Elevated temperatures such as the reflux temperature are generally used. By removing the alcohol by-product formed in the reaction, it is induced to go to completion within a minimum of time. After the theoretical amount of alcohol is collected the reaction is considered completed. The desired product may be conveniently recovered by conventional means such as by fractional distillation.

Some of the novel compounds that are produced in this way are N-methyl-3-piperidyl 3'-morpholinopropionate, N-ethyl-3-piperidyl 2'-pyrrolidinoacetate, N-benzyl-4-piperidyl 2'-piperidinoacetate, N-phenethyl-4-piperidyl 6'-N'-diethylaminocaproate and the like.

Acid addition salts of these and other such compounds as are included within the scope of this invention may be produced by contacting the compound with a suitable acid such as a mineral acid like sulfuric acid or hydrochloric acid, or organic acids like maleic acid, fumaric acid, acetic acid and citric acid.

Quaternary ammonium salts may also be readily prepared by contacting the compounds with alkyl and aralkyl esters of mineral and organic acids, preferably in the presence of a suitable organic solvent. Alkyl halides such as methyl bromide, ethyl iodide, methyl sulfate, benzyl chloride and propargyl bromide are representative compounds that may be used to form quaternary ammonium salts.

The novel compounds of this invention in the form of free bases or non-toxic acid addition salts are useful diuretic agents. The quaternary ammonium salts are potent, long-lasting hypotensive agents of which the bis-methylbromide salts of N-methyl-3-piperidyl 3-N'-disubstituted aminopropionate are typical.

The following examples illustrate specific embodiments of the invention, but it is to be understod that these examples are for illustration only and are not to be considered as restricting the invention.

EXAMPLE 1

*N-methyl-3-piperidyl-3'-morpholinopropionate*

Into a 500 cc. 3-necked round bottom flask equipped with stirrer, reflux condenser, Dean-Stark water separator and calcium chloride tube is placed a solution of 34.6 g. of methyl-β-morpholinopropionate (0.2 mole) and 23.0 g. of N-methyl-3-hydroxypiperidine (0.2 mole) in 325 cc. n-heptane. 0.4 gram of sodium methoxide is added and the mixture refluxed. Methanol, as produced during the transesterification, separates from the heptane in the water separator. Two additional 0.4 g. portions of sodium methoxide may be required to catalyze a complete reaction. (The reaction is completed when an amount of heptane insoluble liquid has separated somewhat in excess of the theoretical amount of methanol.) The reaction mixture is concentrated by slowly distilling off approximately 50% of the heptane. The residue is chilled, filtered, and the balance of the heptane removed by vacuum distillation through an efficient column. The residual liquid is subjected to vacuum distillation through a 5″ column, the desired ester distilling at 126–129° C. at 0.7 mm.

By following the procedure above using the appropriate reactants, the compounds of Table 1 were prepared.

TABLE 1

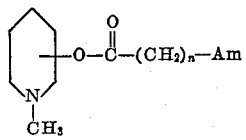

| Position on piperidine ring | $n$ | Am | Yield | B. P./mm. | $N_D^{25}$ | Nitrogen assay | |
|---|---|---|---|---|---|---|---|
| | | | | | | Calc'd. | Found |
| 3 | 2 | Pyrrolidino | 65.6 | 105–108° C./0.3 | 1.4782 | 11.67 | 11.59 |
| 3 | 2 | Morpholino | 80.5 | 126–129° C./0.7 | 1.4804 | 10.94 | 10.83 |
| 3 | 1 | N(CH$_3$)$_2$ | 70.3 | 136–138° C./15 | 1.4590 | 14.00 | 13.55 |
| 3 | 2 | N(CH$_3$)$_2$ | 68.9 | 158–160° C./37 | 1.4589 | 13.08 | 12.86 |
| 4 | 1 | N(CH$_3$)$_2$ | 67.3 | 110–113° C./8 | 1.4589 | 14.00 | 13.90 |

EXAMPLE 2

*N-methyl-3-piperidyl 2'-N'-dimethylaminoacetate dimaleate*

Under anhydrous conditions a solution of 9.5 g. N-methyl-3-piperidyl 2'-N'-dimethylaminoacetate (0.0475 mole) in 50 cc. of isopropanol is added in a dropwise manner to a solution of 11.0 g. of maleic acid (0.095 mole) in 50 cc. of isopropanol at reflux temperature. The mixture is held at reflux temperature 3 hours, cooled, and 50 cc. of anhydrous ether added. An oil separates which crystallizes upon further cooling. The white dimaleate salt is filtered off, washed well with acetone and recrystallized, if necessary, from hot ethanol to obtain the desired compound, melting point 121–122° C. Yield: 16.0 g. or 79% of theory.

*Analysis.*—Calcd. for $C_{18}H_{28}O_{10}N_2$: N, 6.48%. Found: 6.40%. Neutral equivalent, 108. Found: 107.62.

In the same general way other acid addition salts may be prepared.

EXAMPLE 3

*N-methyl-3-piperidyl-2'-N'-dimethylaminoacetate bis-methobromide*

To a solution of 10.0 g. of N-methyl-3-piperidyl-2'-dimethylaminoacetate (0.05 mole) in 75 cc. isopropanol is added 19.0 g. of methyl bromide (0.1 mole+100% excess). The solution is heated to a gentle reflux for 3 hours and then chilled. The quaternary salt separates as an oil which solidifies upon addition of acetone. Recrystallization of the solid from hot ethanol yields the product, M. P. 183–184° C.

By following the general procedure of this example other quaternary salts of other bases were produced as set forth in Table 2.

TABLE 2

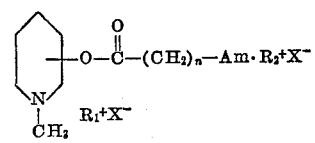

| Position on piperidine ring | $n$ | Am | $R_1$ | $R_2$ | X | Yield, percent | M. P., °C. | Assay | | | |
|---|---|---|---|---|---|---|---|---|---|---|---|
| | | | | | | | | Calcd. | | Found | |
| | | | | | | | | Percent N | Percent halogen | Percent N | Percent halogen |
| 3 | 2 | Pyrrolidino | CH$_3$ | CH$_3$ | I | 73.8 | a165–6 | 5.34 | 48.47 | 5.34 | 48.23 |
| 3 | 2 | Morpholino | CH$_3$ | CH$_3$ | I | 70.8 | b182–3 | 5.19 | 47.04 | 5.12 | 46.44 |
| 3 | 1 | N(CH$_3$)$_2$ | CH$_3$ | CH$_3$ | Br | 97.9 | a183–4 | 7.18 | 41.03 | 7.15 | 40.91 |
| 3 | 2 | N(CH$_3$)$_2$ | CH$_3$ | CH$_3$ | I | 100.0 | c194–5 | 5.62 | 51.00 | 5.66 | 50.77 |
| 4 | 1 | N(CH$_3$)$_2$ | CH$_3$ | CH$_3$ | Br | 48.1 | a263–4 dec. | 7.18 | 41.03 | 7.07 | 40.99 | a Recrystallized from ethanol.
b Recrystallized from methanol.
c Prepared in ethanol.

The following compound was also prepared:

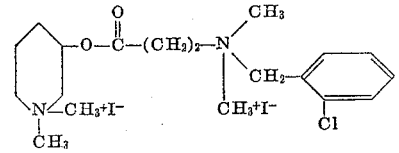

This compound is N-methyl-3-piperidyl 3'-N'-methyl-N'-o-chlorobenzylaminopropionate bis-methiodide and has a melting point of 125° C.

*Analysis.*—Calcd. 4.60% N, 41.74% halogen. Found: 4.59% N, 40.45% halogen.

Various changes and modifications of the invention can be made and, to the extent that such variations incorporate the spirit of this invention, they are intended to be included within the scope of the appended claims.

What is claimed is:

1. A member of the group consisting of compounds of the formulae:

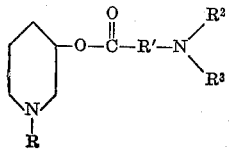

and

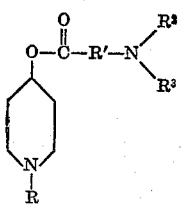

and non-toxic acid addition and quaternary ammonium salts thereof, wherein R is a member of the group consisting of lower alkyl and lower alkyl-phenyl groups, R' is a lower alkylene group, and $R^2$ and $R^3$ are members of the group consisting of lower alkyl groups, lower alkyl-phenyl groups, lower alkene groups, phenyl groups, and groups in which $R^2$ and $R^3$ are joined to each other to form a monocyclic heterocyclic group of the group consisting of morpholino, pyrrolidino and piperidino.

2. N-lower alkyl-3-piperidyl 3'-N'-di lower alkylaminopropionate.

3. N-lower alkyl-3-piperidyl 2'-N'-di lower alkylaminoacetate.

4. N-lower alkyl-4-piperidyl 2'-N'-di lower alkylaminoacetate.

5. A N-lower alkyl-3-piperidyl-N'-di lower alkylaminoacyloxy ester in which the acyloxy group is derived from a lower alkane monocarboxylic acid.

6. A N-lower alkyl-4-piperidyl-N'-di lower alkylaminoacyloxy ester in which the acyloxy group is derived from a lower monocarboxylic acid.

7. N-methyl-3-piperidyl-3'-pyrrolidinopropionate.

8. N-methyl-3-piperidyl 3'-morpholinopropionate.

9. N-methyl-3-piperidyl-2'-N'-dimethylaminoacetate.

10. N-methyl-3-piperidyl-3'-N'-dimethylaminopropionate.

11. N-methyl-4-piperidyl-2'-N'-dimethylaminoacetate.

12. The process which comprises reacting a member of the group of compounds of the formulae

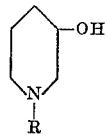

and

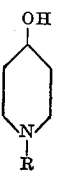

with a compound of the formula

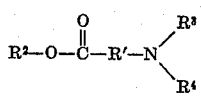

to produce a corresponding number of the group consisting of compounds of the formulae

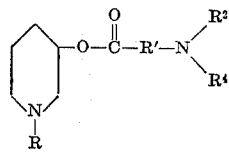

and

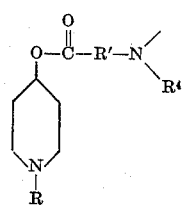

wherein, in each occurrence, R is a member of the group consisting of lower alkyl and lower alkyl-phenyl groups, R' is a lower alkylene group, $R^2$ is a lower alkyl group and $R^3$ and $R^4$ are members of the group consisting of lower alkyl groups, lower alkyl-phenyl groups, lower alkene groups, phenyl groups, and groups in which $R^3$ and $R^4$ are joined to each other to form a monocyclic heterocyclic group of the group consisting of morpholino, pyrrolidino and piperidino.

References Cited in the file of this patent

UNITED STATES PATENTS 2,536,079   Papa _____ Jan. 2, 1951

UNITED STATES PATENT OFFICE
Certificate of Correction

Patent No. 2,856,407                                    October 14, 1958

John H. Biel

It is hereby certified that error appears in the printed specification of the above numbered patent requiring correction and that the said Letters Patent should read as corrected below.

Column 6, line 23, for "number" read *member*; lines 25 to 28, right-hand portion of the formula, for

same column, lines 34 to 36, right-hand portion of the formula, for

Signed and sealed this 10th day of March 1959.

[SEAL]

Attest:
KARL H. AXLINE,
*Attesting Officer.*

ROBERT C. WATSON,
*Commissioner of Patents.*